No. 610,912. Patented Sept. 20, 1898.
T. S. MILLER.
ROPE DRIVING MACHINERY.
(Application filed Oct. 8, 1897.)

(No Model.) 2 Sheets—Sheet 1.

Witnesses.
Ernest Pulsford
W. Wilson

Thomas Spencer Miller
Inventor.
By Gifford & Bull
Attorneys.

No. 610,912. Patented Sept. 20, 1898.
T. S. MILLER.
ROPE DRIVING MACHINERY.
(Application filed Oct. 8, 1897.)
(No Model.) 2 Sheets—Sheet 2.

Witnesses.
Ernest Pulsford.
M. Wilson

Thomas Spencer Miller
Inventor.
By Gifford & Bell
Attorneys

UNITED STATES PATENT OFFICE.

THOMAS SPENCER MILLER, OF SOUTH ORANGE, NEW JERSEY.

ROPE-DRIVING MACHINERY.

SPECIFICATION forming part of Letters Patent No. 610,912, dated September 20, 1898.

Application filed October 8, 1897. Serial No. 654,498. (No model.)

*To all whom it may concern:*

Be it known that I, THOMAS SPENCER MILLER, a citizen of the United States, and a resident of South Orange, in the county of Essex and State of New Jersey, have invented certain new and useful Improvements in Rope-Driving Machinery, of which the following is a specification.

This invention relates to certain improvements in pulleys or drums used for transmitting power or propelling ropes whether as a driving or driven pulley or drum, as will hereinafter fully appear.

To fully understand the nature of my invention, it must be known that in all systems employing ropes for transmission of power the various ropes or strands will not pull alike. This may be due to the different diameters of the ropes or different tensions with which they may be working or enlargements on the same rope, such as a splice. All of these produce differences in circumferential velocity. If now the grooves are turned out from solid pulleys or drums, certain ropes must slip, and this slip produces wear of rope and wear of groove and serious loss of power. Particularly is this noticeable in the cases of Manila or cotton ropes used to transmit power. In practice when separate endless ropes are used old ropes worn down to small diameter and new ones of larger diameter are frequently used on the same drums or pulleys. Suppose, for example, that the driving-pulley is forty inches and the driven twenty inches in diameter. Then if the driver makes one hundred revolutions the driven will make two hundred revolutions. Now if a larger rope be applied it rides higher in the grooves of the pulleys and the effective diameters then may be forty-one inches and twenty-one inches, respectively, and the result will be that this rope will tend to run the driven slower than two hundred—in fact, in this case one hundred and ninety-five revolutions. This means a slip of five revolutions per minute. If this rope slips through the groove, it means loss of power and wear. However, I propose to allow this slip to take place in another way, so as to be less damaging, as will now be explained.

Figure 1:
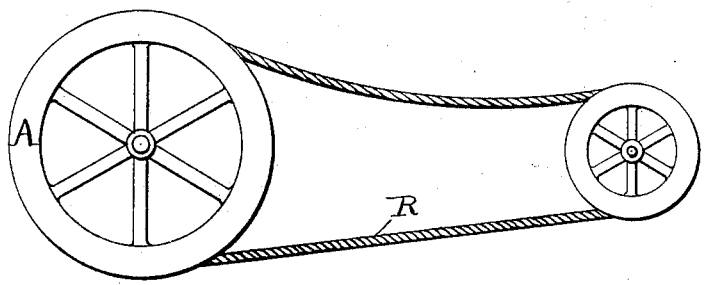
Figure 2:
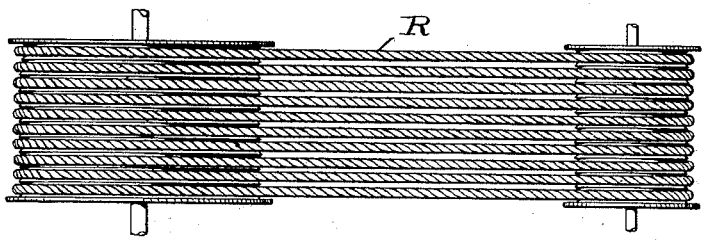
Figure 3:
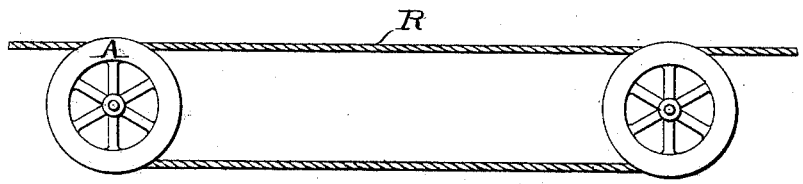
Figure 4:
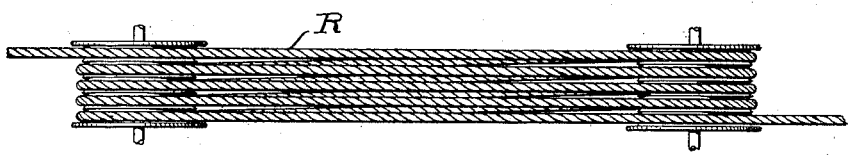
Figure 5:
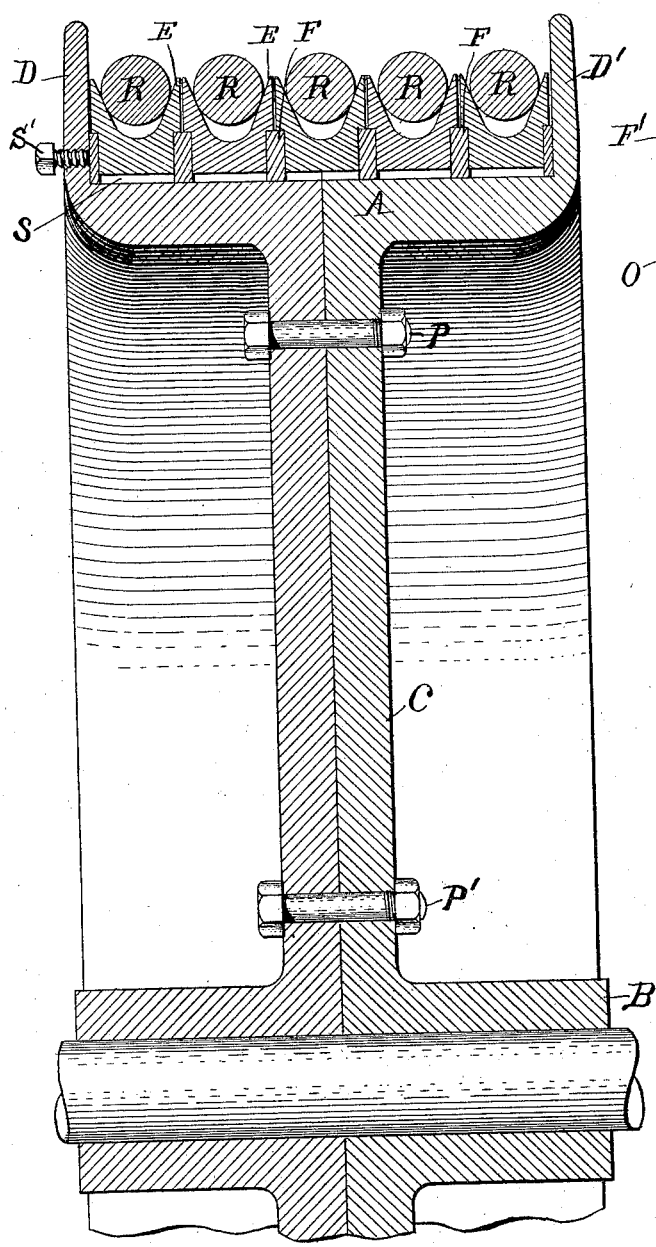
Figure 6:
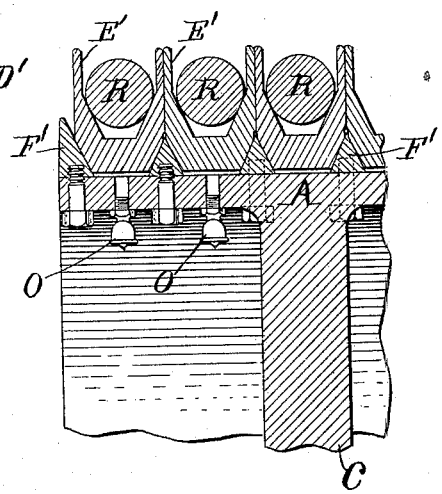
Figure 7:
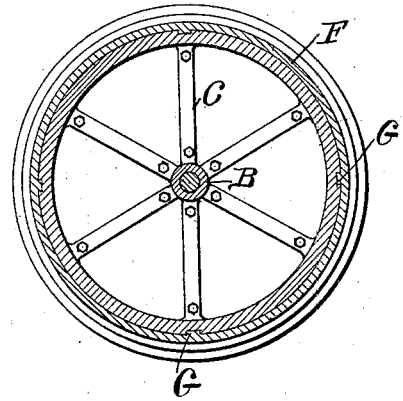

Figure 1 is a side elevation of two pulleys or drums transmitting power by the use of several separate endless ropes. Fig. 2 is a plan view of the same. Fig. 3 is an elevation of a pair of pulleys or drums adapted to drive a single rope and shows the rope wrapped several times about the two drums, either one or both of which may be drivers or driven. Fig. 4 is a plan of same. Fig. 5 shows in detail one form in which my invention may be applied, and Fig. 7 shows a cross-section of one of the pulleys. Fig. 6 shows a section of another form.

Similar letters of reference indicate similar parts in all the figures.

In the drawings, A represents the rim; B, the hub; C, the arm; D D', the flanges; E or E', the grooved rings. Each of these rings is continuous circumferentially, and all are grooved to a similar form to fit the rope R, which is to be applied. In the drawings they are shown with the usual form of groove for use with Manila or cotton ropes. The sides are shaped to accommodate intermediate rings (shown with straight radial sides at F in Fig. 5) and with sides inclined to the radius at F' in Fig. 6. The grooved rings E are free to revolve circumferentially, except as they are held by friction. Rings F of Fig. 5 do not move circumferentially, but are free to move parallel with the axis. These rings F in Fig. 5 are provided with inwardly-extending lugs G, so as to move in slots S, cut parallel with the axis in the face of the pulley or drum. In Fig. 6, however, the rings F' are secured fast to the face of the drum—in fact, may be made part of it. The rope or ropes R have a certain amount of grip or holding power on the grooved rings E and E' due to the tightness with which they are drawn and the arc of contact. Any slipping would be injurious, however, and I propose to so adjust the friction between the rings and the face of the drum as to allow the grooved ring to slip on the pulley-face before the rope can slip in the groove. In Fig. 5 this is accomplished by the screws S', which may be tightened up, as desired, to give the requisite friction by crowding the rings E and F against each other and against the flange D' on the opposite side of pulley. In case of Fig. 6, however, the angle of incline given to the rings F' regulates the amount of resistance to slipping.

Oiling devices O may be applied to the pulley, so as to fully lubricate the rings E and E' to prevent undue wear.

In the construction shown in Fig. 5 I propose to make the pulley in halves and bolt the two parts together by bolts P P' after the rings E and F are applied.

I am well aware that loose rings have been employed before in pulleys and drums; but these have been unsatisfactory in that the power transmitted through them was not immediately given to the pulley. With my device, however, the intermediate rings act as flanges, each capable of transmitting power direct to the rim of the pulley, for it will be observed that the power given by the rope to either of the rings must be transmitted by friction through all the intermediate rings between it and the outside flange.

I do not wish to limit myself to a particular form of ring, but wish to claim, broadly, the interposing of auxiliary rings that will enable the power to be transmitted to the main pulley.

I claim—

1. In combination, a pulley and a rope embracing the same in power-transmitting relationship; the said pulley containing a plurality of grooved peripheral rings adapted to move on the surface of the pulley and an interposed ring adapted to move horizontally but not circumferentially on the pulley and means whereby the frictional contact between the rings may be adjusted whereby power is transmitted through the frictional contact between the grooved rings and interposed ring but said frictional contact permits of slip between the said rings before the rope will slip in a groove, substantially as described.

2. In combination, a pulley and a rope embracing the same in power-transmitting relationship; the said pulley containing a plurality of grooved peripheral rings adapted to move on the surface of the pulley and an interposed ring stayed from circumferential movement whereby power is transmitted through the frictional contact between the grooved ring and interposed ring but said frictional contact permits of slip between the said rings before the rope will slip in a groove, substantially as described.

THOS. SPENCER MILLER.

Witnesses:
JNO. V. BEEKMAN,
CHAS. C. PIERCE.